United States Patent
Van Der Eerden et al.

(10) Patent No.: US 12,344,477 B2
(45) Date of Patent: Jul. 1, 2025

(54) CONVEYOR BELT MODULE WITH PORTIONS FOR OVERLAPPING

(71) Applicants: Marel Poultry B.V., Av Boxmeer (NL); Ammeraal Beltech Modular A/S, Vejle (DK)

(72) Inventors: Harry Van Der Eerden, AV Boxmeer (NL); Germ Buter, Vejle (DK); Kenneth Westergaard Andersen, Vejle (DK)

(73) Assignees: Marel Poultry B.V., Av Boxmeer (NL); Ammeraal Beltech Modular A/S, Vejle (DK)

( * ) Notice: Subject to any disclaimer, the term of this patent is extended or adjusted under 35 U.S.C. 154(b) by 94 days.

(21) Appl. No.: 18/247,387

(22) PCT Filed: Oct. 8, 2021

(86) PCT No.: PCT/EP2021/077887
§ 371 (c)(1),
(2) Date: Mar. 30, 2023

(87) PCT Pub. No.: WO2022/074209
PCT Pub. Date: Apr. 14, 2022

(65) Prior Publication Data
US 2024/0002156 A1    Jan. 4, 2024

(30) Foreign Application Priority Data
Oct. 9, 2020    (EP) .................................... 20201184

(51) Int. Cl.
*B65G 15/48*    (2006.01)
(52) U.S. Cl.
CPC .................................... *B65G 15/48* (2013.01)

(58) Field of Classification Search
None
See application file for complete search history.

(56) References Cited

U.S. PATENT DOCUMENTS

| | | | | |
|---|---|---|---|---|
| 5,921,379 A | * | 7/1999 | Horton | B65G 17/086 198/852 |
| 6,382,405 B1 | * | 5/2002 | Palmaer | B65G 17/086 198/853 |

(Continued)

FOREIGN PATENT DOCUMENTS

| | | |
|---|---|---|
| EP | 2817249 A1 | 12/2014 |
| WO | 2013/029624 A1 | 3/2013 |
| WO | 2013126288 A1 | 8/2013 |

OTHER PUBLICATIONS

International Search Report issued in Application No. PCT/EP2021/077887 mailed on Nov. 12, 2021 (3 pages).

(Continued)

*Primary Examiner* — Kavel Singh
(74) *Attorney, Agent, or Firm* — Osha Bergman Watanabe & Burton LLP

(57) ABSTRACT

There is presented a conveyor belt module (10) with first and second sets of eye parts for allowing connecting the conveyor belt module to a like conveyor belt module (10II) via a rod (41), said conveyor belt module being suitable for a side flexing modular conveyor belt (100), wherein in a cross-sectional plane intersecting an outermost eye part and being orthogonal to a longitudinal axis of the conveyor belt module the conveyor belt module comprises portions of material having positions which on both sides of a plane comprising the longitudinal axis and intersecting both first and second eye parts are present on both sides of axis through both of the first and second eye parts.

14 Claims, 6 Drawing Sheets

(56) References Cited

U.S. PATENT DOCUMENTS

| | | | | |
|---|---|---|---|---|
| 6,615,979 | B2* | 9/2003 | Etherington | B65G 17/40 |
| | | | | 198/852 |
| 7,070,043 | B1* | 7/2006 | MacLachlan | B65G 17/086 |
| | | | | 198/853 |
| 7,837,029 | B2* | 11/2010 | Russell | C09D 5/03 |
| | | | | 198/852 |
| 8,047,356 | B2* | 11/2011 | Elsner | B65G 17/385 |
| | | | | 198/852 |
| 8,985,318 | B2* | 3/2015 | Neely | B65G 17/063 |
| | | | | 198/853 |
| 9,352,907 | B2* | 5/2016 | Westergaard | B65G 17/086 |
| 10,905,129 | B2* | 2/2021 | Malevanets | B65G 15/52 |
| 11,014,751 | B2* | 5/2021 | Perdue | B65G 17/064 |
| 11,053,081 | B2* | 7/2021 | Perdue | B65G 23/06 |
| 11,305,938 | B2* | 4/2022 | Salsone | B65G 15/02 |
| 12,134,522 | B2* | 11/2024 | Westergaard Andersen | |
| | | | | B65G 47/5113 |

OTHER PUBLICATIONS

Written Opinion issued in Application No. PCT/EP2021/077887 mailed on Nov. 12, 2021 (7 pages).
European Search Report issued in European Application No. 20201184.7 mailed on Mar. 26, 2021 (8 pages).

* cited by examiner

CONVEYOR BELT MODULE WITH PORTIONS FOR OVERLAPPING

FIELD OF THE INVENTION

The invention relates to a conveyor belt module, and more particularly a conveyor belt module for a side flexing modular conveyor belt, and furthermore to a corresponding conveyor belt, a modular conveyor belt system, a method for conveying one or more elements and use of conveyor belt.

BACKGROUND OF THE INVENTION

Demand for improving safety and flexibility is ever increasing within the field of modular conveyor belts.

Side-flexing conveyors yield flexibility by enabling in-plane, and optionally out-of-plane, curved modular conveyor belt sections yet might also entail some risk that equipment and/or personal may be damaged or hurt upon contact with a moving conveyor.

Hence, an improved conveyor belt module and a corresponding conveyor belt, a modular conveyor belt system, a method for conveying one or more elements and use of a modular conveyor belt would be advantageous, and in particular an improved conveyor belt module and a corresponding conveyor belt, a modular conveyor belt system, a method for conveying one or more elements and use of conveyor belt which mitigates or eliminates the risk of damage or injury, while preferably maintaining flexibility would be advantageous.

SUMMARY OF THE INVENTION

It may be seen as an object of the present invention to provide a conveyor belt module and a corresponding conveyor belt, a modular conveyor belt system, a method for conveying one or more elements and use of conveyor belt, which overcomes the problems mentioned above. It may be a further object of the present invention to provide an alternative to the prior art. Thus, the above described object and several other objects are intended to be obtained in a first aspect of the invention by providing a conveyor belt module for a side flexing modular conveyor belt, said conveyor belt module comprising:
  a first set of eye parts defining a first axis, and
  a second set of eye parts defining a second axis,
wherein in
  a primary cross-sectional plane intersecting a primary outermost eye part and being orthogonal to the first axis and/or the second axis, such as being orthogonal to the first axis and/or the second axis) at the position of said axis where it traverses the primary outermost eye part, wherein the primary outermost eye part is an eye part being placed outermost in a primary end of the conveyor belt module in a dimension defined by the first axis and/or the second axis, and/or
  a secondary cross-sectional plane intersecting a secondary outermost eye part and being orthogonal to the first axis and/or the second axis, such as being orthogonal to the first axis and/or the second axis) at the position of said axis where it traverses the secondary outermost eye part, wherein the secondary outermost eye part is an eye part being placed outermost in a secondary end of the conveyor belt module in a dimension defined by the first axis and/or the second axis, wherein the secondary end of the conveyor belt module is opposite the primary end of the conveyor belt module, the conveyor belt module comprises portions of material having positions, which, on both sides of a center plane spanned by:
  an axis being parallel with the first axis and/or the second axis, and
  an axis (44) in the cross-sectional plane, such as in the cross-sectional plane being the primary cross-sectional plane or the secondary cross-sectional plane, and intersecting the first axis and the second axis,
are having portions on both sides of each of:
  a plane (52) orthogonal to the center plane and comprising a first intersection between a line, such as a straight line, through the first eye parts and the cross-sectional plane, such as the cross-sectional plane being the primary cross-sectional plane or the secondary cross-sectional plane, such as having positions encircling said line through the first eye parts and the cross-sectional plane, and
  a plane (54) orthogonal to the center plane and comprising a second intersection between a line, such as a straight line, through the second eye parts and the cross-sectional plane, such as the cross-sectional plane being the primary cross-sectional plane or the secondary cross-sectional plane.

A possible advantage of the present invention may be that by having said having portions of material having such positions, when two (optionally identical) conveyor belt modules are oriented similarly and connected to each other, so that axes of each of the two conveyor belt modules are coaxial and the two conveyor belt modules are aligned along these axes, the portions of material of one conveyor belt module will be overlapping with portions of material of the other conveyor belt module, at least when conveyor belt modules are as close together as possible (and in embodiments also when they are as far apart as possible), which entails that access between the portions of material is prohibited (such as prohibits access from one side of the conveyor belt modules to the other side in the cross-sectional plane between axes of the conveyor belt modules), i.e., no object can get between the portions of material from one side to the other of the conveyor belt modules in a direction orthogonal to the center plane, which may in turn increase safety because, e.g., a finger cannot get in between the portions of material via a direction orthogonal to the center plane. The portions of material may similarly shield access to the eye parts and/or rods therein. For example, for a plurality of like conveyor belt modules assembled into a conveyor defining, at least locally, a plane (such as a horizontal plane), it will not be possible to put an object, such as a finger, in a direction (such as a vertical direction) orthogonal to said plane in between the portions of material.

It may be seen as an advantage that it is possible to have an axis of rotation of a conveyor belt module (with the axis of rotation being co-axial with the axis of alignment when conveyor belt modules are aligned—an optionally connected—as described above) where the portions of material of one conveyor belt module between is not very far from the axis of rotation in a direction of the other conveyor belt module, and this in turn has the effect of enabling relatively large rotations (in each direction) of one conveyor belt module with respect to the other conveyor belt module around the axis of alignment.

It may be seen as an advantage that it is possible to provide a conveyor belt module which can be installed upside-down and optionally have its orientation changed upside-down subsequent to being worn, such as effectively doubling a life-time.

A possible advantage of having the portions of material on both sides of the volume delimited by planes orthogonal to the center plane and parallel to the first axis, respectively, the second axis may be that the required distance between positions of material can be satisfied without necessarily having positions of material far away from either axis in a direction parallel with an axis being orthogonal to the first axis and/or the second axis and intersecting both of the first axis and the second axis. This may in turn enable keeping the conveyor belt module compact in a direction along the axis being orthogonal to the first axis and/or the second axis and intersecting both of the first axis and the second axis. A possible advantage of having the portions of material on both sides of the center plane may be that it ensures that access between the portions of material is prohibited from both sides of the center plane, i.e., no object can get to the center plane between the portions of material from either of the two directions orthogonal to a plane which is orthogonal to the cross-sectional plane and comprising the first axis and/or the second axis.

In an alternative formulation, the conveyor belt module may be described as a conveyor belt module, which—when connected to an adjacent identical conveyor belt module—is arranged so that outer eye parts (in one or both ends of the conveyor belt modules), comprise portions of material which (at least when the conveyor belt modules are as close together as possible) are physically blocking any line (such as a line-of-sight) towards a portion of the center plane being between axes of the conveyor belt modules in both directions orthogonal to the center plane, optionally even when the modular conveyor belt modules are as far apart as possible, such as the outer side of the conveyor belt modules during maximal side flexing.

By 'conveyor belt module' may be understood a module which can be combined with other modules, such as other similar or identical modules, optionally by means of rods through the first axes and the second axes, to form some or all of a modular conveyor belt, such as wherein one or more surfaces of the modules form a load surface of the conveyor belt.

The conveyor belt module has a load-carrying surface, such as a load carrying surface being substantially parallel with the center plane and/or planar. The load carrying surface of a central part of the conveyor belt module (such as between outermost eye parts) may be flush with a load carrying surface of one or both outermost eye parts. The conveyor belt module may be connected to an identical conveyor belt module so that load carrying surfaces of (directly, such as with no intermediate elements) connected conveyor belt modules have a planar and uninterrupted load carrying surface in a cross-sectional plane orthogonal to the first axis and/or the second axis.

The conveyor belt module may comprise an elongated (and oriented in a direction of the first axis and/or the second axis) central beam from which the first set of eye parts are extending in a first transverse direction (in the central plane and orthogonal to the first axis and/or the second axis) and the second set of eye parts are extending in a second transverse direction (in the central plane and orthogonal to the first axis and/or the second axis) being substantially opposite, such as opposite (such as anti-parallel), to the first transverse direction.

'Conveyor belt' may generally be understood to be an endless conveyor comprising a plurality of traction elements each given by a conveyor belt module. The surface of the conveyor belt may be formed by the surface of the traction elements. The conveyor belt may be capable of, such as adapted to, follow a curved path in two or three dimensions. A 'side flexing modular conveyor belt' is understood as is common in the art, such as wherein a plurality of, optionally similar or identical, conveyor belt modules are combined in to a conveyor belt, said conveyor belt allows turning in a plane of the conveyor belt (such as for a conveyor belt having a horizontal plane allowing turning around a vertical axis), such as at least turning with a turning radius of 100 m or less, such as 10 m or less, such as 1 m or less. Side flexing may be allowed e.g., by having at least a part of the conveyor belt module being made of a flexible, such as elastic material and/or by having the first set of eye parts and/or the second set of eye parts comprising, such as consisting of, oblong eye parts. By a side flexing modular conveyor belt may generally be understood a modular conveyor belt which can be adapted to follow a curved path.

A 'first set of eye parts' or 'a second set of eye parts' is understood as is common in the art, such as allowing a straight, rigid or flexible, rod to pass through the first or second set of eye parts.

By 'defining a first axis' or 'defining a second axis' may be understood that an axis, such as an axis through a center of the first or second set of eye parts, is defined by the first or second set of eye parts. It is encompassed that the first and/or second axis is curved. The first and/or second axis may be straight. The first axis and the second axis may be substantially parallel, such as parallel.

The first set of eye parts and/or the second set of eye parts may comprise oblong holes, such as oblong holes with a longest extension in a plane orthogonal to the first axis and/or the second axis being in a direction parallel with a line intersecting each of the first axis and the second axis (such as the holes having a horizontal major axis in the cross-sectional plane in case of a conveyor belt module with the first and second axis being in the same horizontal plane).

By 'primary cross-sectional plane' and 'secondary cross-sectional plane' is in each case understood a fictitious plane, where these fictitious planes are in each end—with respect to the first axis and/or the second axis—of the conveyor belt module.

By 'portions of material' may be understood portions of solid material fixedly connected to the first set of eye parts and the second set of eye parts.

By 'positions, which, when projected onto an axis in the cross-sectional plane intersecting the first axis and the second axis, are separated by a distance' is to be understood the largest distance between positions along the axis in the cross-sectional plane intersecting the first axis and the second axis (such as the largest horizontal distance in the cross-sectional plane in case of a conveyor belt module with the first and second axis being in the same horizontal plane).

The line through the first eye parts may be encircled by the positions of material. The line through the first eye parts and the cross-sectional plane may be as far away from a line through the second eye parts. The line through the second eye parts and the cross-sectional plane may be as close as possible to a line through the first eye parts.

In an embodiment there is presented a conveyor belt module wherein the portions of material comprise branched material, such as Y-shaped material or fork-shaped material, wherein A portion, such as a stem portion, of the branched material comprises the outermost eye part being intersected by the cross-sectional plane and the first axis or the second axis, such as encircles the first axis or the second axis, and the other one of the first axis or the second axis intersects the cross-sectional plane at a position between branches of the branched material.

A possible advantage of this may be that a first conveyor belt module can be joined to a second conveyor belt module so that an eye part of a stem portion of the first conveyor belt module can be arranged between branches of the other conveyor belt module. The branches and stem portion may thus overlap. By 'branched' may be understood any shape comprising at least two branches, such as two prongs or parts joined at one positions and extending away from said position, such as extending away in non-parallel (and non-anti-parallel) directions, such a V-shaped, U-shaped, Y-shaped or fork-shaped. In particular embodiments, the branches comprise portions making a smallest angle of less than 30°, such as less than 15°, such as being substantially parallel, such as being parallel.

In an embodiment there is presented a conveyor belt module wherein the conveyor belt module comprises a monolithic element comprising at least
  the first set of eye parts,
  the second set of eye parts, and
  the portions of material
A possible advantage of this may be that strength will increase since there will be no weak joints. Another possible advantage may be that it is hygienic because there will be no joints where dirt, bacteria, etc., can attach. A monolithic conveyor belt module may for example be provided by injection moulding.

In an embodiment there is presented a conveyor belt module wherein the conveyor belt module comprises, such as consists of, polymeric material, such as a single type of polymeric material.

In an embodiment there is presented a conveyor belt module wherein the portions of material are coherent portions of material, such as the portions of material on both sides of the center plane, and not including portions of material in the center plane, are coherent portions of material.
  The portions of material may be
  encircling, such as completely encircling one of the first axis and the second axis, and/or
  the portions of material may be comprising no material, such as an opening, at positions in the center plane being further away from said (encircled) first axis or (encircled) second axis than an intersection between a line, such as a straight line, through the eye parts defining the other one of the first axis and the second axis and the cross-sectional plane.

In an embodiment there is presented a conveyor belt module wherein the portions of material are encircling the first axis or the second axis, such as forming a closed line around the first axis.

In an embodiment there is presented a conveyor belt module wherein the portions of material in each end along an axis being parallel with the cross-sectional plane and intersecting each of the first axis and the second axis occupy mutually exclusive positions in a direction orthogonal to the axis being parallel with the cross-sectional plane and intersecting each of the first axis. This may be beneficial for allowing connecting two similar or identical conveyor belt modules so that the portions of material of the two conveyor belt modules are overlapping (such as the portions of material are arranged so as not to occupy the same space).

In an embodiment there is presented a conveyor belt module wherein the conveyor belt module can be joined to an identical conveyor belt module by:

Positioning the conveyor belt module and the identical conveyor belt module so that
    the first axis of the conveyor belt module and the second axis of the identical conveyor belt module are coaxial,
    the positions of the conveyor belt module and the identical conveyor belt module along the first axis of the conveyor belt module are similar or identical,
  Inserting a rod through the first eye parts of the conveyor belt module and the second set of eye parts of the identical conveyor belt module.

In an embodiment there is presented a conveyor belt module wherein the conveyor belt module has rotational symmetry of second order around one or more of:
  An axis being orthogonal to the first axis and/or the second axis and intersecting both of the first axis and the second axis, and
  An axis being orthogonal to each of:
    The axis being parallel with the first axis and/or the second axis, and
    The axis being orthogonal to the first axis and/or the second axis and intersecting both of the first axis and the second axis.

A possible advantage may be that the conveyor belt module can be rotated, e.g., turned upside-down, and still be mounted correctly in a modular conveyor belt (such as being "fool-proof" during installation). The rotational symmetry may be a two-fold rotational symmetry, such as a rotation symmetry where a similar or identical shape emerges upon rotation 180°. A possible advantage of two-fold rotational symmetry (e.g., around an axis being orthogonal to the first axis and/or the second axis and intersecting both of the first axis and the second axis) may be that it may enable turning the conveyor belt around, such as upside-down, which may in turn beneficial for enabling rotating a conveyor belt module 180° to allow it to be worn on another side with respect to a possibly worn out side, e.g., turning it upside down in case of a worn upper side, which then allow the previous non-worn underside to become the new ready-to-use upper side, i.e., effectively doubling a life-time of the conveyor belt module with possible associated benefits in terms of resources, economy and environment.

In an embodiment there is presented a conveyor belt module wherein the conveyor belt module is arranged such that upon connection to an identical conveyor belt module via a rod inserted through both of the first set of eye parts of the conveyor belt module and the second set of eye parts of the identical conveyor belt module and so that the conveyor belt module and the identical conveyor belt module are identically positioned along the first axis and/or the second axis, the conveyor belt module and the identical conveyor belt module can each be rotated, optionally when the conveyor belt module and the identical conveyor belt module are as close together as possible, around the rod so that a smallest angle between:
  An axis being orthogonal to the first axis and/or the second axis of the conveyor belt module and intersecting both of the first axis and the second axis on the conveyor belt module, and
  An axis being orthogonal to the first axis and/or the second axis of the identical conveyor belt module and intersecting both of the first axis and the second axis on the identical conveyor belt module,
can reach at least 45 degrees, such as at least 50 degrees, such as at least 60 degrees, such as at least 65 degrees, such as at least 70 degrees.

A possible advantage may be that that a modular conveyor belt made from a plurality of similar or identical conveyor belt modules can change direction (around an axis being parallel with the first axis and/or the second axis) more rapidly. This may for example be relevant for having a small radius of curvature around a sprocket wheel and/or for changing said direction, which may for example be relevant for going over a short distance from one plateau to another plateau. This may be advantageous for shortening a length of a modular conveyor band and of a conveyor band system, which may in turn make it cheaper to construct, cheaper to operate, reduce friction and require less space/footprint.

In an embodiment there is presented a conveyor belt module, where portions of material of the outer eye part in the cross-sectional plane encircles the first axis and delimits a concave area comprising the second axis, wherein the outer eye part:

Decreases a dimension, as measured on an axis having a direction orthogonal to the center plane, in a direction from the second axis to the first axis along positions between the second axis and the first axis, and/or Increases a distance between portions of material on either side of the center plane, as measured on an axis having a direction orthogonal to the center plane, in a direction away from the second axis at positions on the opposite side of the second axis with respect to the first axis.

This decrease and/or increase in dimension/distance may serve to facilitate a relatively large angle of rotation of one conveyor belt module with respect to an identical conveyor belt module joined by a rod through, respective, first/second axes. It may be seen as an advantage that the decrease/dimensions are arranged so as to maintain strength at relevant positions yet still allow a large rotational angle.

In an embodiment there is presented a conveyor belt module wherein the portions of material are part of three-dimensional structures, which on one or both sides of a center plane spanned by:

An axis being parallel with the first axis and/or the second axis, and

An axis being orthogonal to the first axis and/or the second axis and intersecting both of the first axis and the second axis, has a surface which is distal with respect to the center plane, parallel with a surface of the second outermost eye part, and equally distanced with respect to the center plane as said surface of the second outermost eye part.

In an embodiment there is presented a conveyor belt module wherein the portions of material are part of three-dimensional structures, which on one or both sides of a center plane spanned by:

An axis being parallel with the first axis and/or the second axis, and

An axis being orthogonal to the first axis and/or the second axis and intersecting both of the first axis and the second axis, has a surface which is substantially flat, such as flat, and substantially parallel, such as parallel, with said center plane.

A possible advantage of this may be that the portions of material may then also function as a load-carrying surface.

In a further embodiment there is presented a conveyor belt module wherein the substantially flat surface is flush and/or physically directly connected with a surface of the neighbouring and/or second outermost eye part. A possible advantage may be that it increases physical strength, and/or that the portions of material can form part of a load-carrying surface, such as part of a plane load-carrying surface.

In a further embodiment there is presented a conveyor belt module The conveyor belt module wherein the substantially flat surface is flush with a surface of the remainder of the conveyor belt module. A possible advantage may be that the portions of material can form part of a load-carrying surface, such as part of a plane load-carrying surface.

In an embodiment there is presented a conveyor belt module wherein the portions of material are part of three-dimensional structures, which, when projected onto a center plane being spanned by:

An axis being parallel with the first axis and/or the second axis, and

An axis being orthogonal to the first axis and/or the second axis and intersecting both of the first axis and the second axis, define an area which, at least along a distance being equal to or larger than a distance in the cross-sectional plane between the first axis and the second axis, has an outermost profile being smooth, such as rectilinear, such as orthogonal to the first axis and/or the second axis.

An advantage of this may be that an edge of a modular conveyor belt module formed from a plurality of conveyor belt modules forming a smooth outer surface at the sides of the modular conveyor belt. This may overcome an issue with prior art modular conveyor belts, which might have perceptible projections, lumps or indentations at the sides, which in effect could provide the moving modular conveyor belt with a (chain-)saw-like effect. Thus, a possible advantage is that the saw-like effect is reduced or eliminated and/or that shielding at the side of a modular conveyor belt is rendered less necessary or unnecessary.

The outermost profile may be arranged so that a corresponding outer profile of a modular conveyor belt formed by a plurality of connected similar or identical conveyor belt modules is smooth, such as wherein the outermost profiles of each conveyor belt module is straight and parallel with a direction of movement of the conveyor belt module.

'Smooth' is understood as is common in the art, such as being a representation of a mathematical function with a continuous first derivative, alternatively such as having an even or regular surface, alternatively such as being free from perceptible projections, lumps or indentations (where 'perceptible' may be understood structures with dimensions in both of two orthogonal directions in the center plane being at least 10 mm, such as at least 8 mm, such as at least 6 mm, such as at least 5 mm, such as at least 4 mm, such as least 2 mm, such as at least 1 mm).

An advantage may be that a rod, such as a rod with a diameter of 10 mm, such as 8 mm, such as 6 mm, such as 5 mm, such as 4 mm, such as 2 mm, such as 1 mm, held orthogonally to both of a conveying direction and the first- and/or second axis, will not be able to get in between portions of the modular conveyor belt.

By 'A larger than B' may generally be understood that A is equal to or larger than 101% B, such as equal to or larger than 102% B, such as equal to or larger than 105% B, such as equal to or larger than 110% B, such as equal to or larger than 125% B, such as equal to or larger than 150% B, such as equal to or larger than 200% B, such as equal to or larger than 500% B, such as equal to or larger than 1000% B and/or (in case of unit being length) that A is at least 1 mm larger than B, such as at least 2 mm larger than B, such as at least 5 mm larger than B, such as at least 10 mm larger than B, such as at least 25 mm larger than B, such as at least 50 mm larger than B, such as at least 100 mm larger than B, such as at least 500 mm larger than B, such as 1000 at least mm larger than B.

In an embodiment there is presented a conveyor belt module wherein the conveyor belt module comprises end portions, such as end portions placed at the end of the conveyor belt module in a dimension defined by the first axis and/or the second axis, blocking access in a direction parallel with the first axis or the second axis from outside of a volume defined by a circumscription of the conveyor belt module and through a plane at the end of the conveyor belt module and into an volume in the cross-sectional plane not occupied by solid material. A possible advantage may be that, e.g., a finger cannot get in between eye parts of adjacent conveyor belt modules in a modular conveyor belt formed from a plurality of similar or identical conveyor belt modules.

In an embodiment there is presented a conveyor belt module wherein the conveyor belt module is arranged to enable being joined to an identical conveyor belt module via a rod inserted through both of the first set of eye parts of the conveyor belt module and the second set of eye parts of the identical conveyor belt module so that in the cross-sectional plane, such as in the cross-sectional plane being the primary cross-sectional plane or the secondary cross-sectional plane, the outermost eye part, such as in the outermost eye part being the primary outermost eye part or the secondary outermost eye part, of the conveyor belt module comprises portions of material of the identical conveyor belt module on both sides of the center plane at a position of the rod.

In an embodiment there is presented a conveyor belt module, wherein in a direction in the cross-sectional plane and along the axis (44) intersecting the first axis and the second axis:
At least a first distal end part of the portions of material occupies positions along a direction orthogonal to the center plane,
which are within and non-overlapping with positions of:
At least a second distal end part of the portions of material, wherein the second distal end is opposite the first distal end,
such as wherein the portions of material which are on the opposite side of the first axis with respect to the second axis have positions exclusively within positions along a direction orthogonal to the center plane, which are occupied by portions of material on the opposite side of the second axis with respect to the first axis.

According to an embodiment, there is presented a conveyor belt module for a side flexing modular conveyor belt, said conveyor belt module comprising:
A first set of eye parts defining a first axis, and
A second set of eye parts defining a second axis,
wherein the eye parts comprise:
A primary group of eye parts,
A secondary group of eye parts, wherein the secondary group of eye parts comprises eye parts placed on both sides of the primary group of eye parts along an axis being parallel with the first axis and/or the second axis.
wherein, in a cross-sectional plane being orthogonal to a line being
orthogonal to the first axis and/or the second axis, and intersecting both of the first axis and the second axis,
a first width ratio of any eye part is given as the ratio of:
a width in a direction parallel with the first axis and/or the second axis of a surface of the eye part at a distal end in a first direction along an axis in the cross-sectional plane and being orthogonal to the first axis and/or the second axis, to
a largest width in a direction parallel with the first axis and/or the second axis of the eye part,
and a second width ratio of any eye part is given as the ratio of:
a width in a direction parallel with the first axis and/or the second axis of a surface of the eye part at a distal end in a second direction being orthogonal to the first direction, to
the largest width in a direction parallel with the first axis and/or the second axis of the eye part,
and wherein a first width ratio and/or a second width ratio is smaller for eye parts within the primary group of eye parts compared to eye parts within the secondary group of eye parts.

Additionally, there is disclosed an attachment unit, such as attachment unit for attachment to an assembled modular conveyor belt, such as for attachment to a conveyor belt module, the attachment unit defining:
a longitudinal direction,
a first transverse direction being perpendicular to each of the longitudinal direction,
a second transverse direction being perpendicular to each of the longitudinal direction and the first transverse direction,
the attachment unit comprising:
a flight part, such as for slowing down or blocking, an element;
an attachment part comprising:
a first set of protrusions comprising one or more protrusions; and
a second set of protrusions comprising one or more protrusions;
where each of the protrusions is extending away from the flight part in the first transverse direction,
where each of the first set of protrusions and the second set of protrusions comprises one or more protrusions, which each has one or more protuberances and/or cavities each extending in a longitudinal direction and/or a second transverse direction, such as a hook for engaging with a recess of the modular conveyor belt, such as of a conveyor belt module, and
wherein the first set of protrusions is off-set along the second transverse direction.

According to an embodiment, there is presented a conveyor belt module system comprising a conveyor belt module and an attachment unit, optionally connected to each other, such a conveyor belt module system, wherein one or more protuberances and/or cavities of one or more attachment units are engaging with one or more recesses and/or extensions of the one or more conveyor belt modules.

According to a second aspect, there is presented a modular conveyor belt comprising a plurality of conveyor belt modules according to the first aspect. One or more surfaces of the, optionally monolithic, conveyor belt module may be a load carrying surface of the modular conveyor belt.

According to an embodiment there is presented the modular conveyor belt wherein the plurality of conveyor belt modules, such as adjacent conveyor belt modules according to the first aspect, are connected to each other by a rod through the first eye parts of one conveyor belt module and the second set of eye parts of another conveyor belt module, such as wherein the conveyor belt module and the other conveyor belt module are identically positioned along the first axis and/or the second axis.

According to an embodiment there is presented the modular conveyor belt wherein a straight line in the cross-sectional plane being orthogonal to the center plane can be drawn to intersect portions of material of two neighbouring conveyor belt modules.

According to an embodiment there is presented the modular conveyor belt wherein a straight line in the cross-sectional plane being orthogonal to the center plane can be drawn to intersect portions of material of two neighbouring conveyor belt modules, when they are as far apart as possible.

According to an embodiment there is presented the modular conveyor belt, wherein the portions of material are having positions so that:

A distance from one end to the other of a projection of the portions of material onto an axis in the cross-sectional plane intersecting the first axis and the second axis, is equal to or larger than A distance given by the difference in the cross-sectional plane between:
  A largest distance between
    1. a first intersection between a line, such as a straight line, through the first eye parts and the cross-sectional plane, and
    2. a second intersection between a line, such as a straight line, through the second eye parts and the cross-sectional plane, and
  a dimension, such as a diameter, of the rod along an axis in the cross-sectional plane intersecting the first axis and the second axis.

A possible advantage of this may be that even when the neighbouring conveyor belt module are furthest apart, there will still be overlap.

By 'being equal to or larger than a largest distance in the cross-sectional plane between a first intersection between a line, such as a straight line, through the first eye parts and the cross-sectional plane, and a second intersection between a line, such as a straight line, through the second eye parts and the cross-sectional plane' is to be understood a distance between intersections in the cross-sectional plane between lines through, respectively, the first and second sets of eye parts, where said lines are arranged to maximize said distance. A possible advantage of this is that it may ensure, that even when a module is combined with one or more similar or identical modules into a side flexing conveyor, there will be overlap between the portions of material even with maximum side flexing, such as minimum radius of curvature.

According to an embodiment there is presented the modular conveyor belt being suitable for conveying food products, such as non-packaged food products, such as non-packaged food products comprising animal protein, such as non-packaged food products being anyone of fish or meat or poultry. By 'suitable for conveying food products' may generally be understood that the modular conveyor belt, under normal or foreseeable conditions of use, does not transfer its constituents to food in quantities which could endanger human health, bring about an unacceptable change in the composition of the food or bring about a deterioration in the organoleptic characteristics thereof and/or that modular conveyor belt is easily cleaned and sanitized by continuous or noncontinuous techniques.

According to a third aspect, there is presented a modular conveyor belt system comprising:
  The modular conveyor belt according to the second aspect,
  Means, such as rails or guides, for controlling a path of the modular conveyor belt, and
  An actuator arranged for driving the modular conveyor belt.

According to an embodiment there is presented the modular conveyor belt system wherein the modular conveyor belt system comprises a portion wherein the modular conveyor belt is side flexing. By 'wherein the conveyor belt is side flexing' may generally be understood that the modular conveyor belt is adapted to follow a curved path, such as a path being curved in a plane spanned by:
  A conveying direction, and
  The first axis and/or the second axis.

According to a fourth aspect, there is presented a method for conveying one or more elements, said method comprising:
  placing the one or more elements on or at the modular conveyor belt according to the second aspect or the third aspect, and
  conveying the one or more elements with the modular conveyor belt.

According to an embodiment there is presented a method for conveying one or more elements wherein said one or more elements comprise food products, such as non-packaged food products, such as non-packaged food products comprising animal protein, such as non-packaged food products being anyone of fish or meat or poultry.

According to a fifth aspect, there is presented use of conveyor belt according to the second aspect or the third aspect for conveying one or more elements, such as wherein said one or more elements comprise food products, such as non-packaged food products, such as non-packaged food products comprising animal protein, such as non-packaged food products being anyone of fish or meat or poultry.

The first, second, third, fourth and fifth aspect of the present invention may each be combined with any of the other aspects. These and other aspects of the invention will be apparent from and elucidated with reference to the embodiments described hereinafter.

BRIEF DESCRIPTION OF THE FIGURES

The conveyor belt module and a corresponding conveyor belt and modular conveyor belt system, a method for conveying one or more elements and use of conveyor belt according to the invention will now be described in more detail with regard to the accompanying figures. The figures show one way of implementing the present invention and is not to be construed as being limiting to other possible embodiments falling within the scope of the attached claim set.

DETAILED DISCLOSURE OF THE INVENTION

Figure 1:
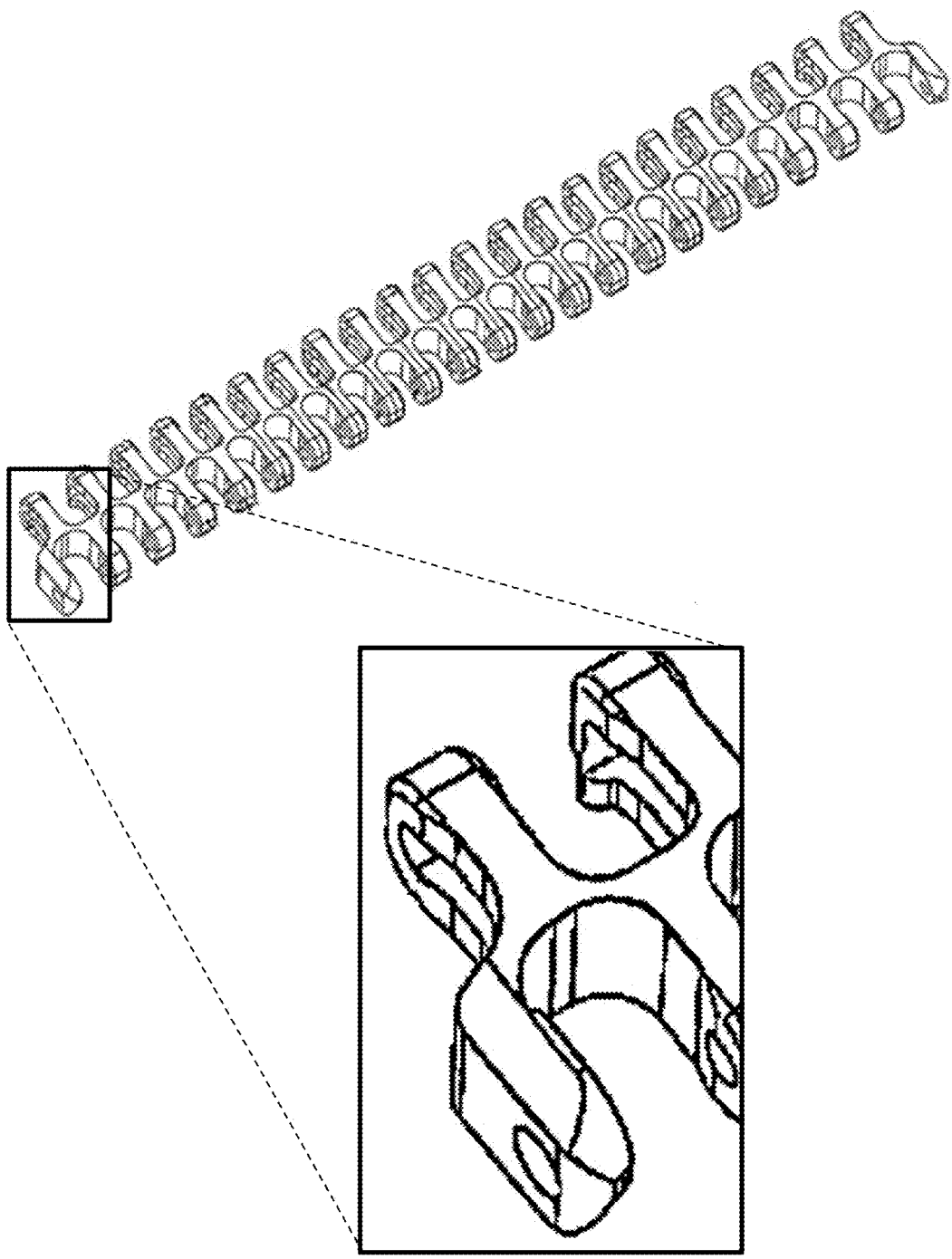
FIG. 1 illustrates conveyor belt module not encompassed by the present invention.

FIG. 1 illustrates a conveyor belt module not encompassed by the present invention, which may together with another similar or identical conveyor belt modules (see also FIG. 7) be assembled into a side flexing modular conveyor belt. This conveyor belt module will in curves not be finger safe if exposed (see for example the outermost end part in the enlarged view in the insert and FIG. 7). If the outer most eye parts are exposed, then this part might have a saw-like effect on anyone standing to close to the conveyor (see also FIG. 7).

Figure 2:
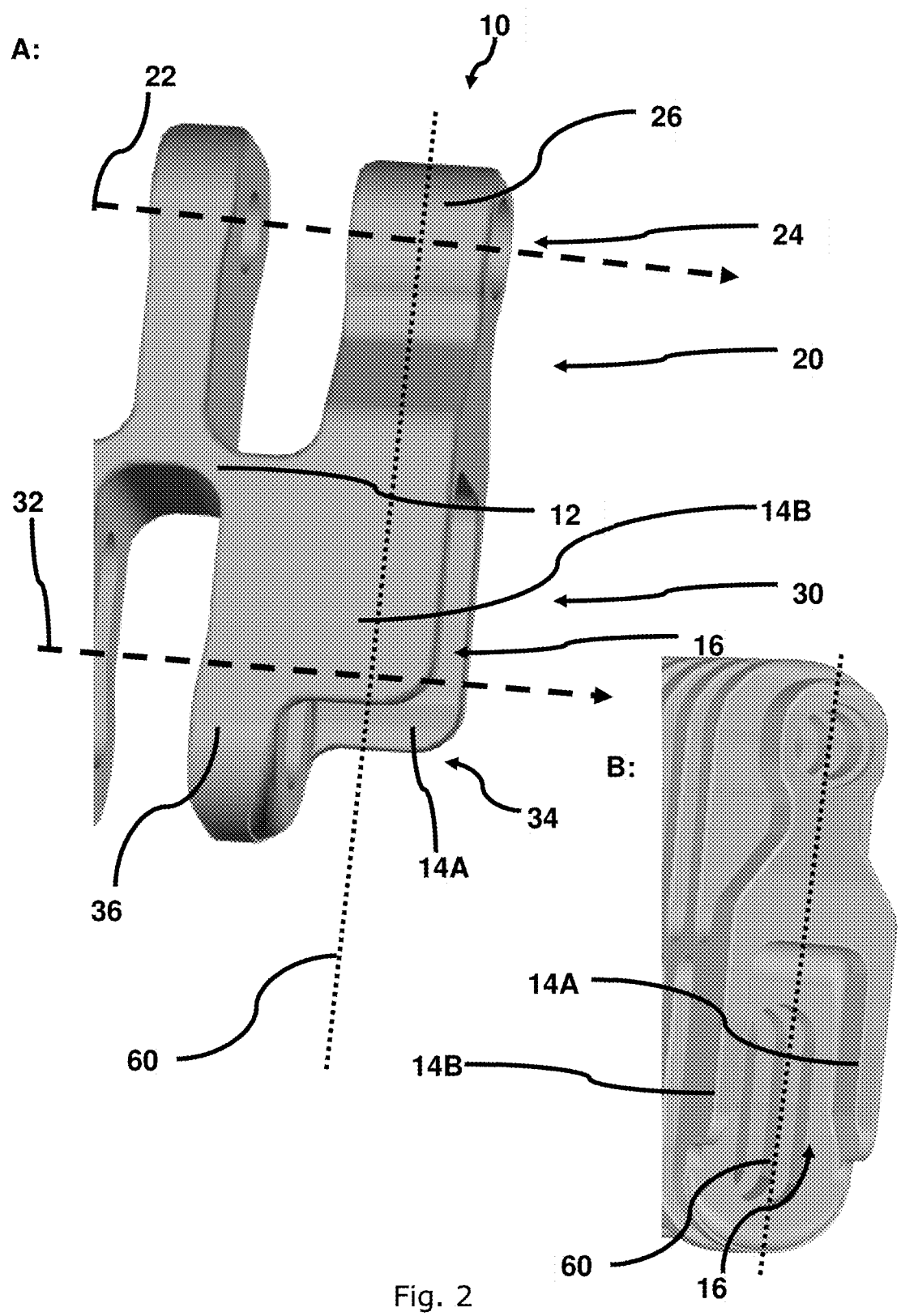
FIG. 2A-2B illustrates conveyor belt module with an outermost eye part and portions of material.

FIG. 2 illustrates one end of a conveyor belt module part 10 with an outermost eye part 26 and a pair of flanges 14A, 14B. The flanges intersect a cross-sectional plane (indicated by dotted line 60 being a line in the cross-sectional plane and intersecting both the first axis and the second axis, see also FIG. 3 where the cross-sectional plane is orthogonal to the plane of the paper) being orthogonal to the first axis (which in the figure is coincidental with the first rod axis 24) and the second axis (which in the figure is coincidental with the second rod axis 32).

Figure 3:
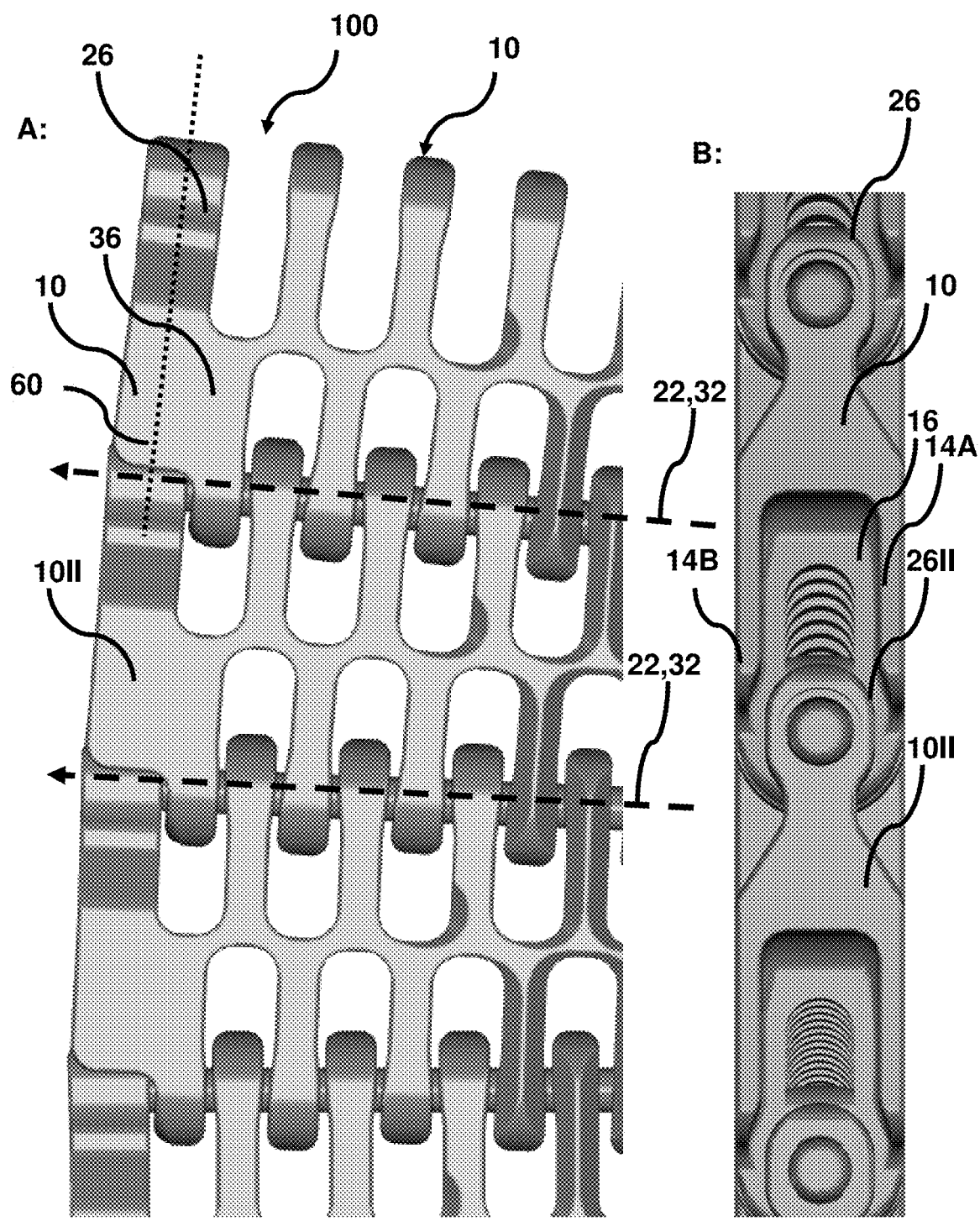
FIG. 3A-3B illustrates a side flexing modular conveyor belt.
Figure 4:
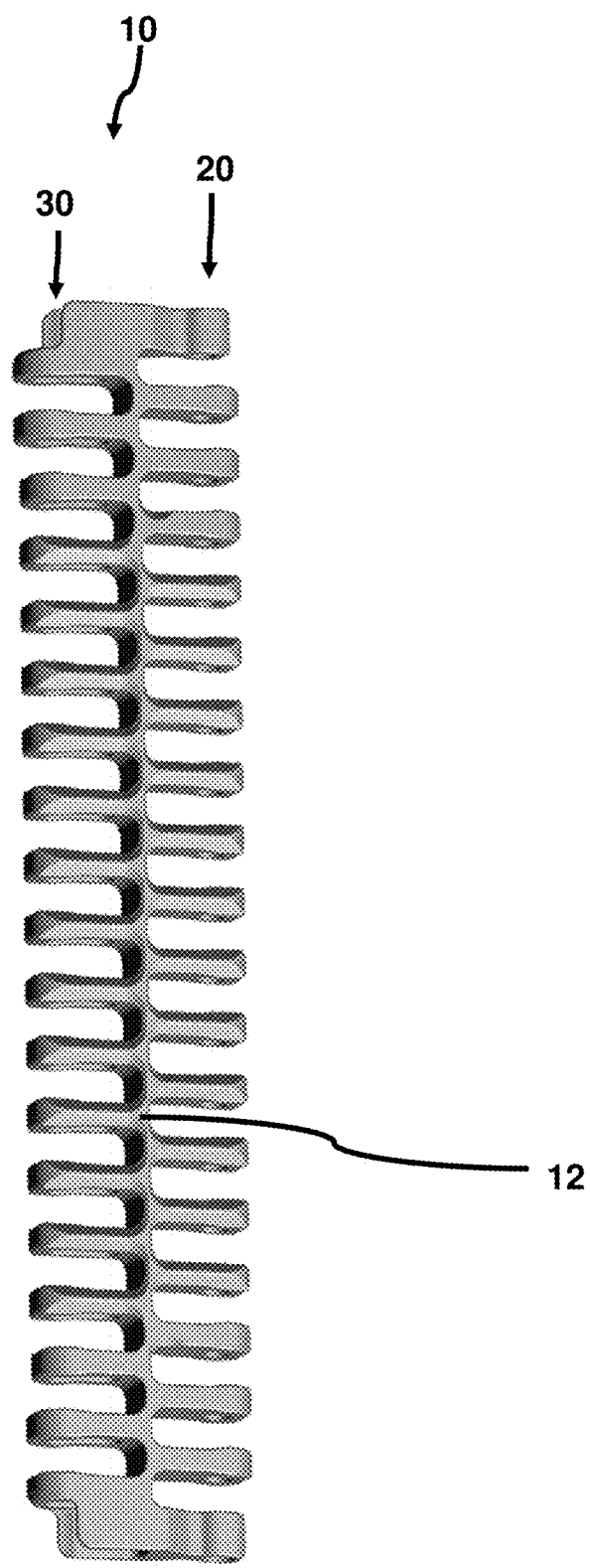
FIG. 4 illustrates a conveyor belt module.

The conveyor belt module part 10 shown in FIGS. 2-4 is adapted for being assembled into a modular side flexing conveyor belt 100 comprising a plurality of conveyor belt modules, see FIG. 3.

The conveyor belt module 10 shown in FIGS. 2-4 may have the eye parts in the first set of eye parts and the eye parts in the second set of eye parts being off-set with respect to each other, so that they can be brought to overlap when two similar or identical conveyor belt modules are oriented identically, and positioned so that their first axis and, respectively, second axis brought into a coaxial position and their positions along the coaxial direction is equal. The conveyor belt module 10 can thus form a row in a modular side flexing conveyor belt.

The conveyor belt module 10 shown in FIGS. 2-4 may be a modular conveyor link which is ready to form a single row in a side flexing conveyor. This is shown in FIG. 4.

The conveyor belt module 10 shown in FIGS. 2-4 comprises a central beam 12.

The conveyor belt module 10 shown in FIGS. 2-4 comprises a first set of eye parts 20 extending from the beam 12. The first set of eye parts 20 has along a first rod axis 22 first apertures 24 for receiving a rod.

The conveyor belt module 10 shown in FIGS. 2-4 comprises a second set of eye parts 30 extending from the beam 12 in an opposite direction to the first set of eye parts 20 and being transversely off-set relative to the first set of eye parts 20. The second set of eye parts 30 having along a second rod axis 32 oblong second apertures 34 for receiving a rod.

The central beam 12 of the conveyor belt module 10 shown in FIGS. 2-4 further comprises a pair of flanges 14A, 14B extending in an opposite direction (with respect to a direction of the eye part away from the central beam) to an outermost eye part 26 of the first set of eye parts 20. The flanges 14A, 14B are adapted to form a channel 16 for receiving at least part of an outermost eye part 26II of another conveyor belt module 10II. This is shown in the right hand part of FIG. 3 (labelled "B"). As disclosed in the right hand part of FIG. 3 (labelled "B"), the oblong second aperture 34 is—in this view—at a position between the pair of flanges 14A, 14B. This enables a larger potential overlap and allows for sharper curving without reducing safety. The outermost eye part 26 is adapted such that the aperture 24 of the outermost eye part 26 can be inserted into the channel 16. This is achieved by making the outermost eye part 26 thinner relative to the other eye parts of the first set of eye parts 24 such that the outermost eye part 26 can be inserted into the channel 16.

The flanges 14A, 14B are connected to the nearest opposite neighbour eye part 36 (such as the second outmost eye part in that end of the conveyor belt module) and the flanges 14A, 14B form two common planes with the nearest opposite neighbour eye part 36 relative to the outermost eye part 26. This will increase the rigidity of the conveyor belt module and enable pulling the conveyor belt module with a larger force around curves without breaking the conveyor belt module.

FIG. 3 illustrates a modular side flexing conveyor belt 100. The modular conveyor belt 100 is assembled from a plurality of conveyor belt modules 10, 10II similar or identical to the conveyor belt module 10 as shown and described in FIG. 2.

The first and second rod axis 22, 32 overlap between different rows of conveyor belt modules and a rod is inserted into along the axis in order to assemble the side flexing conveyor belt 100.

The right hand side of FIG. 3 (labelled "B") discloses how the modular side flexing conveyor belt 100 in the maximum pitch still has an overlap by part of the outermost eye part of a conveyor belt module 10II being inside the channel 16 formed by a pair of flanges 14A, 14B.

FIG. 4 illustrates a conveyor belt module 10, the conveyor belt module comprises all the features shown in FIG. 2 in both ends of the conveyor belt module.

Thus in this case, the conveyor belt module 10 is a conveyor belt module and both longitudinal ends of the central beam comprise a pair of flanges 14A, 14B extending in an opposite direction to an outermost eye part 26 of the first set of eye parts 20, the flanges 14A, 14B being adapted to form a channel 16 for receiving at least part of an outermost eye part 26II of another conveyor belt module 10II.

Figure 5:
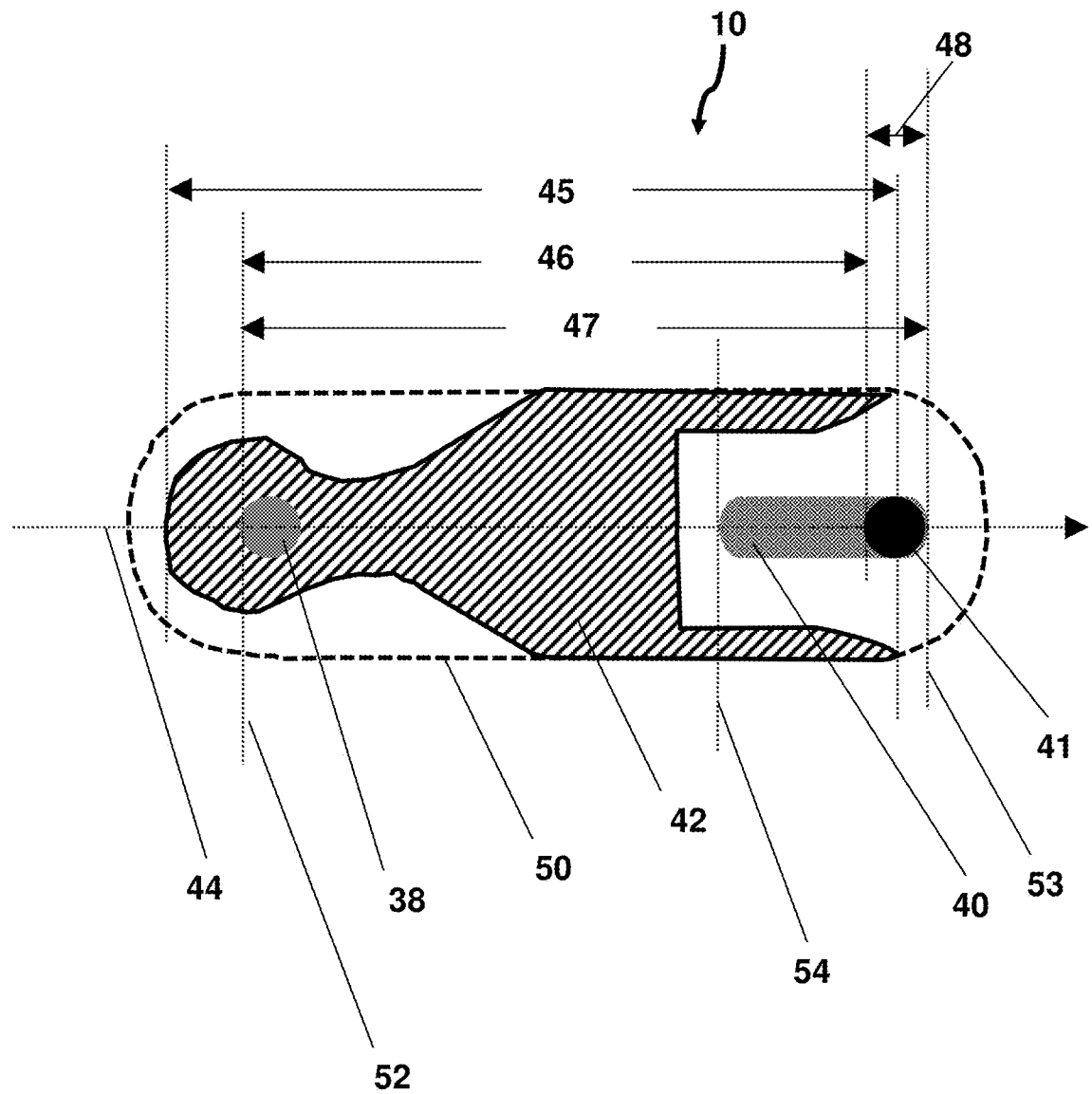
FIG. 5 illustrates a cross-sectional plane of a conveyor belt module.

FIG. 5 shows a cross-sectional view of a conveyor belt module 10, similar to the conveyor belt modules 10 of FIGS. 2-4, and more particularly a cross-sectional plane intersecting an outermost eye part and being orthogonal to the first axis and/or the second axis of a conveyor belt module (as defined by the eye parts, such as first apertures 38 in first eye parts and, respectively, second apertures 40 in the second eye parts). The dashed line indicates portions of conveyor belt module which do not intersect the cross-sectional plane. The hatched area 42 indicates material in the cross-sectional plane, having positions on both sides (such as above and below in the present figure) of a center plane (orthogonal to the plane of the paper) spanned by:
  an axis being parallel with the first axis and/or the second axis, and
  an axis (44) in the cross-sectional plane and intersecting the first axis and the second axis,
are having portions on both sides (such as left and right in the present figure) of each of:
  a plane (52) orthogonal to the center plane and comprising a first intersection between a line, such as a straight line, through the first eye parts and the cross-sectional plane, where in FIG. 5 the portions of material are encircling said line through the first eye parts, and
  a plane (54) orthogonal to the center plane and comprising a second intersection between a line, such as a straight line, through the second eye parts and the cross-sectional plane, where in FIG. 5 said line through the second eye parts is as close as possible to the first eye parts.

In other words, the portions of material is present in all four areas ("quadrants") above and below the center plane and left/right of a volume delimited by planes orthogonal to the cross-sectional plane and comprising the intersection between lines through, respectively, first and second eye parts and the cross-sectional plane.

The portions of material in the cross-sectional plane comprises Y-shaped material wherein a stem portion of the Y-shaped material (in the left-hand side of FIG. 5)) comprises the outermost eye part being intersected by the cross-sectional plane and the first axis and encircles the first axis, and the second axis intersects the cross-sectional plane at a position between branches (in the right-hand side of FIG. 5) of the branches of the Y-shaped material.

The portions of material on both sides of the center plane (even when not including the center plane) are coherent portions of material, such as safeguarding that access through the portions of material is prohibited.

The portions of material are completely encircling the left axis in FIG. 5 and the portions of material comprises no material at positions in the center plane being further away (i.e., to the right of, in FIG. 5) from said encircled axis than an intersection between a straight line through the eye parts the right axis and the cross-sectional plane, where the opening is arranged so as to allow a mating relationship between an encircling part of one conveyor belt module with an opening of another conveyor belt module.

A left side distal end part of the portions of material occupies positions along a direction orthogonal to the center plane, which are within and non-overlapping with positions of a right side distal end of the portions of material. In other words, at least a part of the encircling left hand, such as the entire left hand, end fits at least partially within, such as completely within, the right hand side opening.

The conveyor belt module in FIG. 5 is shown with a rod 41 connecting it to a neighbouring conveyor belt module (not shown) forming part of a modular conveyor belt (not shown), where the portions of material 42 are having positions so that:
  A distance 45 from one end to the other of a projection of the portions of material onto an axis in the cross-sectional plane intersecting the first axis and the second axis,
is equal to or larger than
  A distance 46 given by the difference in the cross-sectional plane between:
    A largest distance 47 between
      1. a first intersection between a line, such as a straight line, through the first eye parts and the cross-sectional plane (such as the intersection between axis 44 and dotted line 52), and
      2. a second intersection between a line, such as a straight line, through the second eye parts and the cross-sectional plane (such as the intersection between axis 44 and dotted line 53), and
    a dimension 48, such as a diameter, of the rod 41 along an axis 44 in the cross-sectional plane intersecting the first axis and the second axis.

Figure 6:
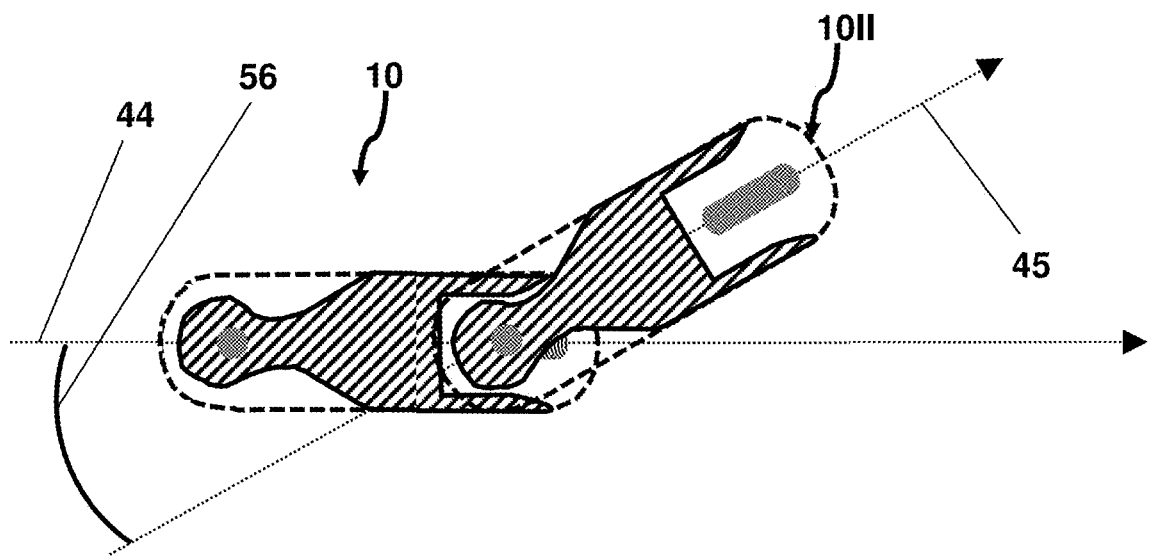
FIG. 6 shows a conveyor belt module 10 joined with an identical conveyor belt module 10II.

FIG. 6 shows a conveyor belt module 10 joined with an identical conveyor belt module 10II via a rod inserted through both of the second set of eye parts of the conveyor belt module 10 and the first set of eye parts of the identical conveyor belt module 10II and so that the conveyor belt module and the identical conveyor belt module are identically positioned along the first axis and/or the second axis, and the conveyor belt module and the identical conveyor belt module are shown with the identical conveyor belt module rotated around the rod so that a smallest angle 56 between:
  An axis 44 being orthogonal to the first axis and/or the second axis of the conveyor belt module and intersecting both of the first axis and the second axis on the conveyor belt module, and
  An axis 45 being orthogonal to the first axis and/or the second axis of the identical conveyor belt module and intersecting both of the first axis and the second axis on the identical conveyor belt module,
is non-zero, such as substantially different from zero, such as approximately 30°. The possibility of rotating, such as rotating to relatively large angles, may be realized by certain features of the portions of material, such as the concave shape on one or both sides of the (neck or) stem portion and/or the truncated, rounded or sloped ends of one or both of the branched portions.

This may be realized by having portions of material of the outer eye part in the cross-sectional plane encircling the first axis and delimiting a concave area comprising the second axis, wherein the outer eye part:
  Decreases a dimension, as measured on an axis having a direction orthogonal to the center plane, in a direction from the second axis to the first axis along positions between the second axis and the first axis (such as the portions of material getting thinner in a vertical direction when going left from a position of the second aperture 40 towards the first aperture 38 in FIG. 5), and/or
  Increases a distance between portions of material on either side of the center plane, as measured on an axis having a direction orthogonal to the center plane, in a direction away from the second axis at positions on the opposite side of the second axis with respect to the first axis (such as the opening between portions of material getting wider in a vertical direction when going right from a position of the middle of the second aperture 40 in FIG. 5).

Figure 7:
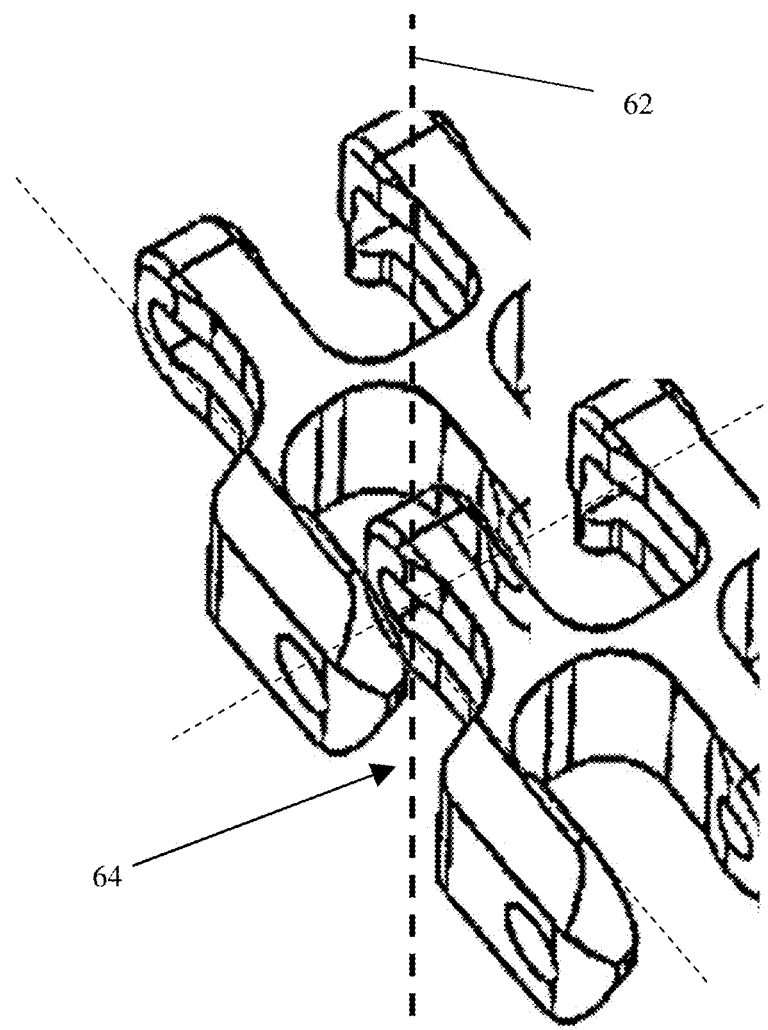
FIG. 7 shows a plurality of conveyor belt modules not encompassed by the prior art and combined together.

FIG. 7 shows conveyor belt modules not encompassed by the present invention, where a line of sight 62 exists through the cross-sectional plane through outer eye parts (where a finger can potentially get injured by entering the volume 64 between adjacent outermost eye parts).

To sum up, there is presented a conveyor belt module (10) with first and second sets of eye parts for allowing connecting the conveyor belt module to a like conveyor belt module (10II) via a rod (41), said conveyor belt module being suitable for a side flexing modular conveyor belt (100), wherein in a cross-sectional plane intersecting an outermost eye part and being orthogonal to a longitudinal axis of the conveyor belt module the conveyor belt module comprises portions of material having positions which on both sides of a plane comprising the longitudinal axis and intersecting both first and second eye parts are present on both sides of axis through both of the first and second eye parts.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A conveyor belt module for a side flexing modular conveyor belt, said conveyor belt module comprising:
   a first set of eye parts defining a first axis, and
   a second set of eye parts defining a second axis,
   wherein:
   in a cross-sectional plane, being a primary cross-sectional plane, intersecting a primary outermost eye part and being orthogonal to the first axis and/or the second axis, wherein the primary outermost eye part is an eye part being placed outermost in a primary end of the conveyor belt module in a dimension defined by the first axis and/or the second axis, and/or
   in a cross-sectional plane, being a secondary cross-sectional plane, intersecting a secondary outermost eye part and being orthogonal to the first axis and/or the second axis, wherein the secondary outermost eye part is an eye part being placed outermost in a secondary end of the conveyor belt module in a dimension defined by the first axis and/or the second axis, wherein the secondary end of the conveyor belt module is opposite the primary end of the conveyor belt module,
   the conveyor belt module comprises portions of material having positions, which, on both sides of a center plane spanned by:
   an axis being parallel with the first axis and/or the second axis, and
   an axis in one or more of the cross-sectional planes and intersecting the first axis and the second axis,
   with respect to the axis in the one or more of the cross-sectional planes, have portions on both sides of each of:
   a first plane that is orthogonal to the center plane and comprising a first intersection between a line, such as a straight line, through the first eye parts and the cross-sectional plane, and
   a second plane, different from the first plane, that is orthogonal to the center plane and comprising a second intersection between a line, such as a straight line, through the second eye parts and the cross-sectional plane;
   wherein the conveyor belt module has rotational symmetry of second order around one or more of:
   an axis being orthogonal to the first axis and/or the second axis and intersecting both of the first axis and the second axis, and
   an axis being orthogonal to each of:
     the axis being parallel with the first axis and/or the second axis, and
     the axis being orthogonal to the first axis and/or the second axis and intersecting both of the first axis and the second axis.

2. The conveyor belt module according to claim 1, wherein the portions of material comprise branched material, such as Y-shaped material or fork-shaped material, wherein:
   a portion, such as a stem portion, of the branched material comprises the outermost eye part being intersected by the cross-sectional plane and the first axis or the second axis, such as encircles the first axis or the second axis, and
   the other one of the first axis or the second axis intersects the cross-sectional plane at a position between branches of the branched material.

3. The conveyor belt module according to claim 1, wherein the conveyor belt module comprises a monolithic element comprising at least:
   the first set of eye parts,
   the second set of eye parts, and
   the portions of material.

4. The conveyor belt module according to claim 1, wherein the conveyor belt module is arranged such that upon connection to an identical conveyor belt module via a rod inserted through both of the first set of eye parts of the conveyor belt module and the second set of eye parts of the identical conveyor belt module and so that the conveyor belt module and the identical conveyor belt module are identically positioned along the first axis and/or the second axis, the conveyor belt module and the identical conveyor belt module can each be rotated around the rod so that a smallest angle between:
   an axis being orthogonal to the first axis and/or the second axis of the conveyor belt module and intersecting both of the first axis and the second axis on the conveyor belt module, and
   an axis being orthogonal to the first axis and/or the second axis of the identical conveyor belt module and intersecting both of the first axis and the second axis on the identical conveyor belt module,
   can reach at least 45 degrees.

5. The conveyor belt module according to claim 1, wherein the portions of material are part of three-dimensional structures, which on one or both sides of a center plane spanned by:
   an axis being parallel with the first axis and/or the second axis, and
   an axis being orthogonal to the first axis and/or the second axis and intersecting both of the first axis and the second axis,
   has a surface which is substantially flat, such as flat, and substantially parallel, such as parallel, with said center plane.

6. The conveyor belt module according to claim 5, wherein the substantially flat surface is flush with a surface of the remainder of the conveyor belt module.

7. The conveyor belt module according to claim 1, wherein the portions of material are part of three-dimensional structures, which, when projected onto a center plane being spanned by:
   an axis being parallel with the first axis and/or the second axis, and
   an axis being orthogonal to the first axis and/or the second axis and intersecting both of the first axis and the second axis,
   define an area which, at least along a distance being equal to or larger than a distance in the cross-sectional plane between the first axis and the second axis, has an outermost profile being smooth, such as rectilinear, such as orthogonal to the first axis and/or the second axis.

8. The conveyor belt module according to claim 1, wherein the conveyor belt module comprises end portions, such as end portions placed at the end of the conveyor belt module in a dimension defined by the first axis and/or the second axis, blocking access in a direction parallel with the first axis or the second axis from outside of a volume defined by a circumscription of the conveyor belt module and through a plane at the end of the conveyor belt module and into an volume in the cross-sectional plane not occupied by solid material.

9. The conveyor belt module according to claim 1, wherein the conveyor belt module is arranged to enable being joined to an identical conveyor belt module via a rod inserted through both of the first set of eye parts of the conveyor belt module and the second set of eye parts of the identical conveyor belt module so that in the cross-sectional plane the outermost eye part of the conveyor belt module comprises portions of material of the identical conveyor belt module on both sides of the center plane at a position of the rod.

10. A modular conveyor belt comprising a plurality of conveyor belt modules according to claim 1.

11. A modular conveyor belt system comprising:
the modular conveyor belt according to claim 10;
rails or guides for controlling a path of the modular conveyor belt; and
an actuator arranged for driving the modular conveyor belt.

12. The modular conveyor belt system according to claim 11, wherein the modular conveyor belt system comprises a portion wherein the modular conveyor belt is side flexing.

13. A method for conveying one or more elements, said method comprising:
placing the one or more elements on or at the modular conveyor belt of claim 10; and
conveying the one or more elements with the modular conveyor belt.

14. The method for conveying one or more elements according to claim 13, wherein said one or more elements comprise food products, such as non-packaged food products, such as non-packaged food products comprising animal protein, such as non-packaged food products being anyone of fish or meat or poultry.

* * * * *